Patented Dec. 31, 1946

2,413,613

UNITED STATES PATENT OFFICE 2,413,613

HIGH MOLECULAR POLYHYDRIC ESTERS

Eddy W. Eckey, Wyoming, Ohio, and James E. Taylor, Boonton, N. J., assignors to The Procter & Gamble Company, Ivorydale, Ohio, a corporation of Ohio No Drawing. Original application April 22, 1943, Serial No. 484,074. Divided and this application June 6, 1946, Serial No. 674,938

4 Claims. (Cl. 260—410.6)

Our invention relates to a new class of esters of high molecular weight polyhydric alcohols with polymerized fatty acids, this application being a division of our application Serial No. 484,074, filed April 22, 1943. The esters claimed herein are derived from polyhydric alcohols which have the structure of polymerized fatty acids with primary alcohol groups in place of the carboxyl groups of these acids, such alcohols being claimed in the said earlier application.

These polyhydric alcohols, which include glycols as well as compounds having more than two hydroxyl groups, may be referred to as polymeric alcohols because of their polymerized structure. They are highly viscous liquids at ordinary temperature, have high molecular weights (they contain upwards from 32 carbon atoms in the molecule), and relatively low melting points. Because of these and other desirable properties which they possess they are superior, for certain uses, to the previously known high molecular weight glycols and other polyhydric alcohols, which are solid rather than liquid at ordinary temperatures. Our new alcohols are also useful in the synthesis of compounds of even higher molecular weight. Stearic acid esters of these alcohols may be made, to name but one of many possible derivatives, and these are of particular interest because of their surprisingly low melting points.

The esters of these new polyhydric alcohols with polymerized fatty acids are high molecular weight, low melting resins. Because of their unique chemical and physical properties they possess special advantages as plasticizers and blending agents in rubber substitutes and in various plastics and surface coatings, such as those made of alkyd resins. Some of our new esters have, moreover, been found to have properties similar to those of crude rubber, and to be capable of compounding and vulcanization to produce rubber-like products.

These several products of our invention may be made by a variety of methods, employing various combinations of known steps. In general, there are two steps which may be considered basically essential when the starting material is a fat or fatty acid, namely: Polymerization of unsaturated fatty materials, and reduction of —CO—O— groups to —CH$_2$—O— groups. If the starting material is an unsaturated glyceride oil, such as soybean oil for example, the several steps employed may include polymerizing, hydrolyzing, distilling off unpolymerized fatty acids, and reducing the —COOH groups of the polymers to —CH$_2$OH groups.

Several departures from these steps are possible and at times advantageous, and considerable freedom of choice exists as to varying the sequence of the steps, or carrying out two or more of them simultaneously. For example, the essential step of forming polymers (which may be performed with or without the aid of a catalyst) may be carried out either with the fatty acids or with derivatives of these, such as their glycerides or ethyl or methyl esters, or with monomeric esters of the fatty acids and corresponding fatty alcohols. If the polymerized material is to be freed from unpolymerized material by distillation or other means, this purification step may be applied to the polymerized fatty acids or their ethyl or methyl esters or to the reduction product, i. e. the polymeric alcohols. This choice, as to when to eliminate unpolymerized material, may depend upon the chemical form in which the unpolymerized by-product is desired.

The essential step of reducing the carboxyl groups to alcohol groups may be applied to the fatty acids or to esters or to certain metallic soaps of the fatty acids, as hereinafter described. If esters of the polyhydric alcohols with fatty acid polymers rather than unesterified polyhydric alcohols are desired, as the main product, an esterification step may follow the reducing step, or may be caused to proceed simultaneously with this step. Still other variations in procedure will be evident to those wishing to produce our new compounds.

Suitable methods of preparing these novel compounds will be more fully understood from the following illustrative examples.

*Example 1.*—A quantity of polymerized soybean oil fatty acids was prepared by blowing a slow stream of steam through soybean oil for six hours while holding the oil at 300° C. and under an absolute pressure of 5 mm. of mercury, cooling the oil, which had dropped in iodine value from 130 to 88 and had increased in Butyro refractive index from 57.8 to 75.4, saponifying the oil with an excess of potassium hydroxide solution, acidulating with aqueous hydrochloric acid, washing with water, and drying. The fatty acids so obtained were separated into polymerized and unpolymerized fractions by distillation, at an absolute pressure of 3 mm. of mercury, with a current of steam, with the temperature in the still gradually raised to 275° C. The undistilled residue, about 51% of the original still charge, had an acid value of 140, a saponification value of 163, an iodine value of 107 and a Butyro refractive index of 88.2 at 48° C.

These polymerized fatty acids, consisting for the most part of the dimeric polymers although containing some higher polymers as well (as judged by fractional distillation and refractive index evidence), were heated and agitated with an equivalent amount of litharge until the fatty acids were converted to their lead soaps. These soaps were heated gradually to 340° C. during a period of about 2 hours, under hydrogen pressure, and then were agitated for 15 minutes at 340° C. in the presence of hydrogen at 4,000 pounds per square inch pressure, thus reducing —CO—O— groups of the fatty acid radicals to —CH$_2$—OH groups of the corresponding alcohols. The hydrogenation product, after boiling with an excess of a 10% solution of hydrochloric acid and water washing until free from mineral acid, was found to be a viscous liquid at room temperature and to have an acid value of 1.8, saponification value of 21.6, a hydroxyl value of 123, and an iodine value of 102, indicating that the product consisted predominantly of polymerized free alcohols, together with a substantial amount of esters of these alcohols with the polymerized acids.

*Example 2.*—A quantity of polymerized linseed oil fatty acids was prepared by heating caustic refined and filtered linseed oil for 12 hours at 300° C., while protected from contact with air, and saponifying, acidulating, washing, and drying the polymerized product as in Example 1. These fatty acids were freed of unpolymerized material by blowing with steam in a still maintained at an absolute pressure of 0.2 inches of mercury while raising the temperature to 240° C. and holding it there for two hours. A portion of the still residue, having an acid value of 148, was hydrogenated for a period of about five hours at hydrogen pressures ranging from 2,000 to 4,000 pounds per square inch and at temperatures ranging gradually up to 320° C., with the aid of a copper chromite catalyst. The resulting product, consisting principally of glycols in the form of dimeric fatty alcohol polymers, had an acid value of 0.3, a saponification value of 14.7, a hydroxyl value of 145, and an iodine value of 52.4.

A portion of this mixture of glycols was esterified by heating, between 180° and 220° C. for about two hours, with an approximately equal amount of another portion of the polymerized linseed oil fatty acid still residue, while bubbling nitrogen through the reacting liquids. The resulting mixture of esters, containing some unesterified material, had an acid value of 7.5, and was a very thick, stringy syrup at room temperature.

*Example 3.*—Another portion of the mixture of glycols derived from linseed oil, as described in the first paragraph of Example 2, was esterified, in a manner similar to the procedure described in the last paragraph of Example 2, with an approximately equal quantity of polymerized soybean oil fatty acids which had been freed of unpolymerized material. After this preliminary esterification, the esterification was carried further towards completion by blowing the mixture with steam for six hours at 250° C., under an absolute pressure of 2 mm. of mercury, thus producing a tough, almost jelled, synthetic resin having an acid value of 3.1.

*Example 4.*—A quantity of lead soaps of polymerized linseed oil fatty acids was hydrogenated by agitating under hydrogen pressures ranging from 2,000 to 4,000 pounds per square inch and at temperatures gradually raised to 280° C. over a period of about 1½ hours. After washing with an excess of dilute hydrochloric acid and water washing, the resulting mixture, which was composed mostly of polyhydric alcohols, had an acid value of 3.8 and a saponification value of 29.0.

*Example 5.*—Lead salts of polymerized linseed oil fatty acids may be prepared by saponifying polymerized linseed oil with caustic soda solution and reacting the resulting sodium soaps with lead nitrate. After washing and drying, the lead soaps thus prepared may be agitated in the presence of an excess of hydrogen, with no added catalyst, while gradually raising the temperature to about 340° C., and while maintaining a hydrogen pressure of about 2,000 to 3,000 pounds per square inch over a total heating and agitating period of about one and a half to two hours. The reaction mixture is then cooled, boiled with an excess of a 10% solution of hydrochloric acid, and water washed until free from mineral acid. The acidulated hydrogenation product thus prepared will be quite low in acid value but may have a saponification value in the neighborhood of 30 to 40. It may be freed of saponifiable material by boiling with an excess of caustic potash solution, extracting the unsaponified material with ethyl ether, and distilling off the solvent. The resulting unsaponifiable material will have a hydroxyl value in the neighborhood of 190 to 200 and an iodine value of about 100 and will consist mostly of primary fatty alcohols. It may be subjected to dry distillation at about 140° to 200° C., under an absolute pressure of one millimeter of mercury, in order to free it of unpolymerized material. The residue, constituting a major fraction of the material subjected to distillation, will have an iodine value above 100, a Butyro refractive index of over 90 to 48° C., and will be a very viscous liquid.

*Example 6.*—Lead soaps of tung oil fatty acids, prepared and hydrogenated in a manner similar to that described in connection with soaps of linseed oil fatty acids in Example 5, yield upon saponification and extraction an unsaponifiable mixture which is rich in alcohol polymers and which has a hydroxyl value of about 195 as compared with a theoretical hydroxyl value of 211 for alcohols derived from tung oil fatty acids. By subjecting this mixture to distillation under an absolute pressure of one millimeter of mercury and thus separating it into two parts, a distillate boiling below 155° C. at this pressure, and a residue which does not boil when the temperature is raised to 200° C., a very viscous residue is obtained having an iodine value of 99 and a Butyro refractive index of 108 at 48° C.

*Example 7.*—A quantity of cadmium soaps of polymerized tung oil fatty acids are prepared by a method similar to that described in Example 5 for the preparation of polymerized linseed oil lead soaps. The cadmium soaps are hydrogenated, without added catalyst, at 4,000 pounds per square inch hydrogen pressure for three hours at temperatures gradually raised to 340° C. The resulting product, after washing with mineral acid followed by water washing, is found to consist principally of esters of polymerized fatty acids with the corresponding polymerized alcohols, and to have an acid value of about 25 to 30, a saponification value of about 90 to 95, and an iodine value of slightly over 100.

A preferred procedure for obtaining one form of our novel product comprises: (1) Forming methyl esters of the fatty acids of an oil which is rich in fatty acids more unsaturated than oleic acid, by refluxing a mixture of the oil, an excess of dry methanol, and a small amount of sodium methoxide for an hour or more, then washing out the catalyst, drying the esters, and distilling to separate them from residual triglycerides; (2) polymerizing the methyl esters by heating for about 20 hours at 300° C., without the use of a catalyst, and subjecting the polymerized methyl esters to steam distillation under reduced pressure to free them of unpolymerized material; (3) forming lead soaps of the polymerized fatty acids by heating and stirring the polymerized methyl esters and an equivalent amount of litharge in the presence of steam, and then hydrogenating these soaps at high temperature and pressure to form polyhydric primary alcohols having, for the most part, 36 or more carbon atoms in the molecule. These alcohols may, if desired, be freed of saponifiable matter by known means.

When polyesters of these polyhydric alcohols with polymerized fatty acids are desired either of two preferred methods may be employed to accomplish the esterification. One is to follow the hydrogenation of the carboxyl groups of the acids with a separate esterification reaction, as in Examples 2 and 3. The other is to form cadmium soaps of the polymerized fatty acids, instead of lead soaps, and hydrogenate these, thus obtaining a reduction of some of the carboxyl groups and a substantially simultaneous esterification of these groups with unreduced carboxyl groups, as in Example 7.

The reduction of unsaturated fatty acids to alcohols and esters by high temperature and high pressure hydrogenation of lead or cadmium salts of these fatty acids, without added catalysts, leaves most double carbon bonds unsaturated. These double carbon bonds may be saturated, if desired, either by known catalytic hydrogenation procedures, usually at approximately atmospheric pressure, or by employing copper soaps, instead of lead soaps, in the step of reducing the carboxyl groups of polymerized fatty acids.

Our new type of polyhydric alcohols may be produced from unsaturated fatty acids generally, provided a major portion of the fatty acids are more unsaturated than oleic acid, or from glycerides or other esters of these fatty acids, whether of natural or synthetic origin. In addition to the naturally occurring vegetable oils mentioned in the preceding examples, corn oil, cottonseed oil, fish oils, oiticica oil, and dehydrated castor oil make suitable raw materials from which to form various of our products.

Naturally occurring unsaturated fatty materials have for the most part 18 carbon atoms in the fatty acid radicals, although some having 16 and others having 20, 22, 24 and even more carbon atoms are known. Our new polyhydric alcohols may thus have 32, 36, 40, 44, 48, or more carbon atoms in the molecule, and they may also contain even higher multiples of 16, 18, 20, 22 and 24 carbon atoms. They have, when free from unpolymerized material, molecular weights above 450.

In the third paragraph above reference is made to the fact that the hydrogenation of lead or cadmium salts of unsaturated fatty acids leaves most of the double carbon bonds unsaturated in the resulting fatty alcohols and esters thereof. The application of this general statement to the case of the polymeric alcohols and esters formed by hydrogenation of lead or cadmium soaps according to the present invention will be apparent from the following summary of the iodine value data contained in the preceding examples:

| Example number | Source of the polymerized fatty acids used | Material subjected to hydrogenation | Type of polymerized product formed | Iodine value of product |
|---|---|---|---|---|
| 1 | Soybean oil | Pb soaps | Alcohols | 102 |
| 2 | Linseed oil | Fatty acids [1] | do | [1] 52.4 |
| 3 | | (Iodine value not determined) | | |
| 4 | | (Iodine value not determined) | | |
| 5 | Linseed oil | Pb soaps | Alcohols | Above 100 |
| 6 | Tung oil | do | do | 99 |
| 7 | do | Cd soaps | Esters | 100+ |

[1] In Example 2 a copper chromite catalyst was used.

Each of the three oils used in the examples is composed of glycerides of fatty acids of which 90% and over are $C_{18}$ fatty acids (Jamieson "Vegetable Fats and Oils," 1943 edition, A. C. S. Monograph Series, see p. 307 for soybean oil, p. 270 for linseed oil, and p. 322 for tung oil). An unpolymerized $C_{18}$ fatty alcohol having one double carbon bond, i. e. $C_{17}H_{33}CH_2OH$, has an iodine value of $$100 \times \frac{\text{mol. wt. } I_2}{\text{mol. wt. fatty alcohol}}$$

or $$100 \times \frac{253.84}{268} = 94.7$$

and (without making any assumptions as to the mechanism of polymerization) polymeric alcohols have this same iodine value provided they contain 18 carbon atoms and one double carbon bond for each hydroxyl group, i. e. provided they conform with the formula $(C_{17}H_{33}CH_2OH)_n$. The products of Examples 1, 5, 6, and 7 (having iodine values above 94.7 and being formed from $C_{18}$ fatty acids, polymerized and reduced to $C_{18}$ alcohols) must therefore contain an average of slightly more than one double carbon bond per hydroxyl group.

The polymeric alcohols of our invention when formed by hydrogenation of lead soaps of corresponding fatty acids (as contrasted with alcohols formed by catalytic hydrogenation of fatty acids) may thus be characterized as unsaturated fatty alcohol polymers having carbon chain structures similar to those of unsaturated fatty acid polymers, with primary alcohol groups in place of carboxyl groups, and containing 16 to 24 carbon atoms and an average of at least one double carbon bond per primary alcohol group.

The degree of unsaturation of these polymeric alcohols may alternatively be compared with the unsaturation of the corresponding unpolymerized fatty acids from which they are derived. It is known that the iodine values of the vegetable oils used as starting materials in the preceding examples are as shown in the second column of the following table, and from these the iodine values of the corresponding mixed fatty acids (shown in the fourth column) are calculated by multiplying by $$\frac{(3 \times \text{mol. wt. linoleic acid} + \text{mol. wt. glycerin} - 3 \times \text{mol. wt. water})}{3 \times \text{mol. wt. linoleic acid}}$$

or by 878/840:

| Oil | I. V. of oil | Page reference in Jamieson, ibid. | I. V. range of mixed fatty acids |
|---|---|---|---|
| Soybean | 124-136 | 306 | 130-142 |
| Linseed | 170-204 | 270 | 178-213 |
| Tung | 157-172 | 320 | 164-180 |

The polyesters of these new polyhydric alcohols may comprise polymerized alcohol radicals from one source and polymerized fatty acid radicals from either the same or a different source. These polyesters may be employed without further chemical change for many purposes, as for use in surface coatings, whereas for other purposes, such as synthetic rubber, it may be desirable to add to or modify their structures.

In the following claims it is to be understood that the term "high molecular weight" means having 32 or more carbon atoms in the molecule; also that the term "polyhydric" includes dihydric, and that the term "polymerized fatty acids" includes dimeric polymers, i. e. polymers comprising a combination of two fatty acid molecules.

The term "fatty alcohols" is used to designate primary aliphatic alcohols of the series which may be thought of as fatty acids whose —COOH groups have been reduced to —CH$_2$OH groups.

Having thus described our invention, what we claim as new and desire to be secured by Letters Patent is:

1. Esters of unsaturated polyhydric alcohols with unsaturated fatty acid polymers, said alcohols having the structure of heat polymerized fatty acids with primary alcohol groups in place of the carboxyl groups of said acids, said polyhydric alcohols containing from 32 to 48 carbon atoms, and having an average of at least one double carbon bond per primary alcohol group.

2. A high viscosity, low melting mixture consisting predominantly of esters of polyhydric alcohols with fatty acid polymers, said alcohols having molecular weights above 450 and having substantially the carbon chain structures of heat polymerized fatty acids in which dimeric polymers predominate, and having an average of at least one double carbon bond per hydroxyl group.

3. The product of claim 2, wherein said fatty alcohol polymers are derived from soybean oil.

4. The product of claim 2, wherein said fatty alcohol polymers are derived from linseed oil.

EDDY W. ECKEY.
JAMES E. TAYLOR.